(12) United States Patent
Ames et al.

(10) Patent No.: US 12,233,559 B2
(45) Date of Patent: Feb. 25, 2025

(54) SYSTEMS AND METHODS FOR AUTOMATED FRAMING CONSTRUCTION

(71) Applicant: BotBuilt, Inc., Durham, NC (US)

(72) Inventors: Christopher Barrett Ames, Durham, NC (US); Kenneth Marenco, Durham, NC (US); David Miron, Durham, NC (US)

(73) Assignee: BotBuilt, Inc., Durham, NC (US)

( * ) Notice: Subject to any disclaimer, the term of this patent is extended or adjusted under 35 U.S.C. 154(b) by 125 days.

(21) Appl. No.: 18/097,092

(22) Filed: Jan. 13, 2023

(65) Prior Publication Data

US 2023/0226695 A1  Jul. 20, 2023

Related U.S. Application Data

(60) Provisional application No. 63/299,608, filed on Jan. 14, 2022.

(51) Int. Cl.
| | |
|---|---|
| *B25J 9/00* | (2006.01) |
| *B25J 9/16* | (2006.01) |
| *B25J 11/00* | (2006.01) |
| *B25J 15/00* | (2006.01) |

(52) U.S. Cl.
CPC ............. *B25J 9/1687* (2013.01); *B25J 9/163* (2013.01); *B25J 9/1697* (2013.01); *B25J 11/0055* (2013.01); *B25J 11/0075* (2013.01); *B25J 15/0066* (2013.01)

(58) Field of Classification Search
CPC ... B25J 9/1664; B25J 9/1671; G05B 19/4155; G05B 2219/40269; G05B 2219/40298; G05B 19/41885
See application file for complete search history.

(56) References Cited

U.S. PATENT DOCUMENTS

| | | | |
|---|---|---|---|
| 2,544,499 A | 3/1951 | Hovey | |
| 8,606,399 B2 | 12/2013 | Williams et al. | |
| 10,189,176 B2 | 1/2019 | Williams | |
| 2019/0316369 A1* | 10/2019 | Pivac | E04B 1/02 |
| 2022/0010608 A1 | 1/2022 | Dittrich et al. | |

FOREIGN PATENT DOCUMENTS

| | | |
|---|---|---|
| CN | 208358221 U | 1/2019 |
| DE | 102004029581 A1 | 1/2006 |
| EP | 1351803 B1 | 5/2006 |

* cited by examiner

*Primary Examiner* — Ian Jen
(74) *Attorney, Agent, or Firm* — Goodwin Procter LLP

(57) ABSTRACT

Techniques of automated framing for use in the construction of building structures are described. Examples of such structures includes walls, wall panels, roofs, and the like. In one scenario, a robotic automated framing system assists with construction of a building structure. The robotic automated framing system can analyze an architectural plan and determine a project, based at least in part, on the architectural plan. The robotic automated framing system can also schedule a robot to perform the project, and cause the robot to perform at least some of the project.

20 Claims, 7 Drawing Sheets

SYSTEMS AND METHODS FOR AUTOMATED FRAMING CONSTRUCTION

CROSS-REFERENCE TO RELATED APPLICATIONS

This application claims priority to and the benefit of U.S. Provisional Application No. 63/299,608 titled "Automated Framing Construction" and filed Jan. 14, 2022, which is incorporated herein by reference in its entirety.

TECHNICAL FIELD

The present disclosure generally relates to the construction of building structures. More specifically, the present disclosure relates to techniques, systems, and methods for automated framing construction of a part or all of a building or non-building structure that employs at least one computer-controlled robot.

BACKGROUND

As used herein, construction refers to the making or forming of an object (e.g., a building structure, a non-building structure, a component of a building structure, etc.) by combining or arranging parts or elements of the object. A building structure is an object with a roof and walls standing in one place, such as a house or factory. For example, a plurality of walls and a roof can be used to form a residential building (i.e., a single family unit). A component of building structure is a constituent part of the structure. For example, the wall panels used to form a wall are components of the wall.

Conventional construction operations can often be dependent on slow, inefficient, rigid, expensive and manual construction techniques. These conventional construction operations are labor intensive and imprecise because of the inherent high variability of conventional construction materials used. The conventional construction materials can be limited to specific size requirements, and thus, may not fit or meet specifications required for its intended use. In some cases, conventional construction operations that are used for assembling buildings from such conventional construction materials are often performed offsite from the construction site. The resulting sub-components are transported to the job site and assembled into a building.

In a specific example, construction of a structure, such as a frame residence, is a process that involves many steps. One of the earliest steps is the construction of the framing for the structure. Framing consists of: (i) cutting a building material (e.g., timber, metal, etc.) (ii) arranging the cut building materials in a way to carry the loads of the floors above and the roof; and (iii) fastening the arranged building materials together.

The framing is usually performed flat on a surface or the ground, and the walls then are stood on end and connected to the foundation and to each other. Most frequently, this is done on the building site. Pre-fabricated building is the process of doing part, or all, of the home construction in a factory, and shipping completed pieces that must be joined together on site.

There are at least two problems with the existing attempts to automate framing construction when the building material used is lumber. First, there is a high uncertainty in the size and shape of builder grade lumber. Wood is a natural product that is affected by a number of parameters including temperature and moisture. Thus, depending on the age of the tree, how it is milled, and its moisture content (which changes over time) the lumber will take on different characteristics. This leads to errors when robot arms attempt to grasp and handle the wood, and fit it together into, e.g., wall panels. The current solution to this problem is to use only high quality wood for automated processes, which increases costs. The second major problem is diversity of design. Many manufacturing lines are targeted at replicable units like hotel rooms or dorm rooms, to amortize the cost and effort of programming robots and other equipment to automate building tasks. Human labor still predominates in manufactured housing for diverse, individualized structures. Some businesses address design diversity by severely limiting the number and different mixes of architectural components, and provide differentiation through superficial styling.

The foregoing discussion, including the description of motivations for some embodiments, is intended to assist the reader in understanding the present disclosure, is not admitted to be prior art, and does not in any way limit the scope of any of the claims.

SUMMARY

Techniques for automated construction of an object, such as a building or non-building structure or a component of such a structure, employing at least one robot are presented. The techniques include the use of a robotic automated framing system and at least one method of using the same. Various embodiments described herein include one or more of the following features.

For example, and in one embodiment, a robotic automated framing system assists with construction of a building structure. The robotic automated framing system can analyze an architectural plan and determine a project, based at least in part, on the architectural plan. The robotic automated framing system can also schedule a robot to perform the project, and cause the robot to perform at least some of the project.

In some embodiments, the robotic automated framing system can include a non-transitory computer-readable medium including instructions executable by one or more processors of a robotic automated framing system for use in construction of a building structure. The non-transitory computer-readable medium including instructions executable by one or more processors of a robotic automated framing system for use in construction of a building structure configured to: analyze an architectural plan, the architectural plan for use in the construction of the building structure; determine a project based, at least in part, on the architectural plan; schedule a robot to perform the project; and cause the robot to perform at least some of the project.

Various embodiments of the medium can include one or more of the following features.

In some embodiments, the architectural plan can include a building code. The instructions to schedule the robot to perform the project can include instructions to: optimize the schedule using artificial intelligence ("AI"). The instructions to schedule the robot to perform the project can include instructions to: cause the robot to select a tool; and operate the tool. The tool can include a gripper, an alignment tool, a measuring tool, a fastening tool, a coupling tool, an encapsulation tool, a cutting tool, a finishing tool, a painting tool, or any combination thereof. The instructions to operate the tool can include instructions to: select, using the robot, a first piece of building material or a second piece of building material; align the first piece of building material and the second piece of building material with each other: and join the first and second pieces of building material to each other. The medium can further include instructions executable by the one or more processors of the robotic automated framing system to determine one or more characteristics of the first piece of building material or the second piece of building material using information acquired from a sensor.

In some embodiments, a computer-implemented method for operating a robotic automated framing system to use in construction of a building structure is presented. The method can include analyzing an architectural plan, the architectural plan for use in the construction of the building structure. The method can include determining a project based, at least in part, on the architectural plan. The method can include scheduling a robot to perform the project. The method can include causing the robot to perform at least some of the project.

Various embodiments of the method can include one or more of the following features.

In some embodiments, the step of scheduling the robot to perform the project can include optimizing the schedule using artificial intelligence ("AI"). The step of causing the robot to perform at least some of the project can include causing the robot to select a tool, and operating the tool. The step of operating the tool can include selecting, using the robot, a first piece of building material or a second piece of building material, aligning the first piece of building material and the second piece of building material with each other, and joining the first and second pieces of building material to each other. The method can further include determining one or more characteristics of the first piece of building material or the second piece of building material using information acquired from a sensor.

In some embodiments, a robotic automated framing system for use in construction of a building structure including one or more computer-controlled robots is presented. The system can be configured to: analyze an architectural plan, the architectural plan for use in the construction of the building structure; determine a project based, at least in part, on the architectural plan; schedule the one or more computer-controlled robots to perform the project; and cause the one or more computer-controlled robots to perform at least some of the project.

Various embodiments of the system can include one or more of the following features.

In some embodiments, the one or more computer-controlled robots being configured to schedule the one or more computer-controlled robots to perform the project can include the one or more computer-controlled robots configured to optimize the schedule using artificial intelligence ("AI"). The one or more computer-controlled robots being configured to schedule the one or more computer-controlled robots to perform the project can include the one or more computer-controlled robots configured to select a tool, and operate the tool. The one or more computer-controlled robots being configured to schedule the one or more computer-controlled robots to perform the project can include the one or more computer-controlled robots configured to select a first piece of building material or a second piece of building material, align the first piece of building material and the second piece of building material with each other, and join the first and second pieces of building material to each other. The one or more computer-controlled robots can be further configured to determine one or more characteristics of the first piece of building material or the second piece of building material using information acquired from a sensor.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1A:
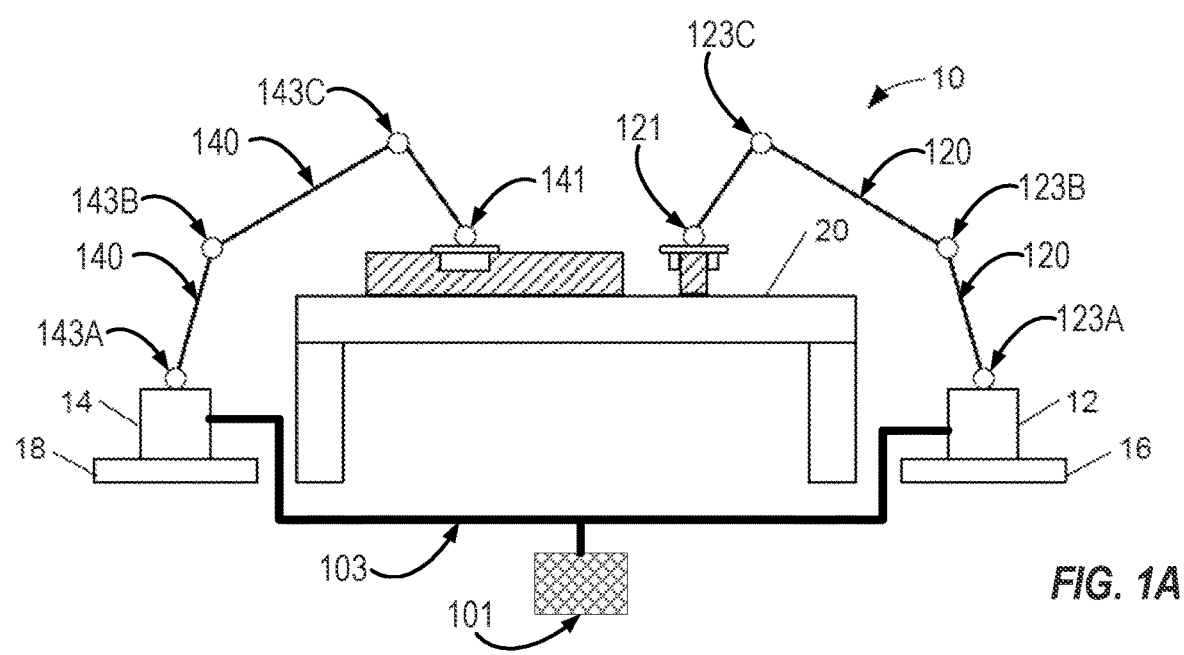
FIG. 1A is a schematic side view illustration of a robotic automated framing system comprising two computer-controlled robots, according to at least one embodiment.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

The present disclosure generally relates to automated, efficient, flexible, and/or cost-effective, creation of components for building construction. Embodiments described herein assist with simplification and/or decreasing of construction time for buildings. Additionally, embodiments described herein include systems, methods, and/or techniques for reliably and repeatably constructing building structures, as well as, the components that make up such structures.

Embodiments described herein present numerous advantages, all of which are evident from the description provided below in connection with FIGS. 1A-7. For example, at least one embodiment of the robotic automated framing construction system and techniques of using such a system introduces considerable flexibility in the construction of building structures (when compared to at least one currently available system, method, or technique of constructing building structures). For example, and as described in further detail in connection with FIGS. 1A-7, at least one computer-controlled robot is capable of working with a variety of tools, to accomplish a wide variety of tasks, including tasks associated with constructing building structures. For another example, embodiments of described herein can work equally well with any architectural or structural plans. In this way, difficulties associated with diversity of design in different plans are minimized or eliminated. Furthermore, embodiments described herein employ the use of at least one sensor, and as a result, the embodiments can handle deviations in characteristics of tools and/or building materials, which allows the use of different types of building materials, such as builder grader lumber, that prior art systems cannot work with. This flexibility is enabled by several aspects of the embodiments described herein. One aspect responsible for flexibility is the variety of tools that are provided to and can be used by computer-controlled robots set forth by the embodiments described herein. Another aspect responsible for flexibility is the ability of the embodiments described herein to implement motion planning to enable a computer-controlled robot to alter its operation based on changes to the task at hand and/or the environment. Yet another aspect that enables flexibility is the use of software including artificial intelligence ("AI") software. AI enables the embodiments described herein to update, adjust, and alter an architectural or structural plan based on an availability of actual building material in real-time, which does away with the need to rely on hypothetical or idealized amounts of building material.

Example Configurations

Figure 1B:
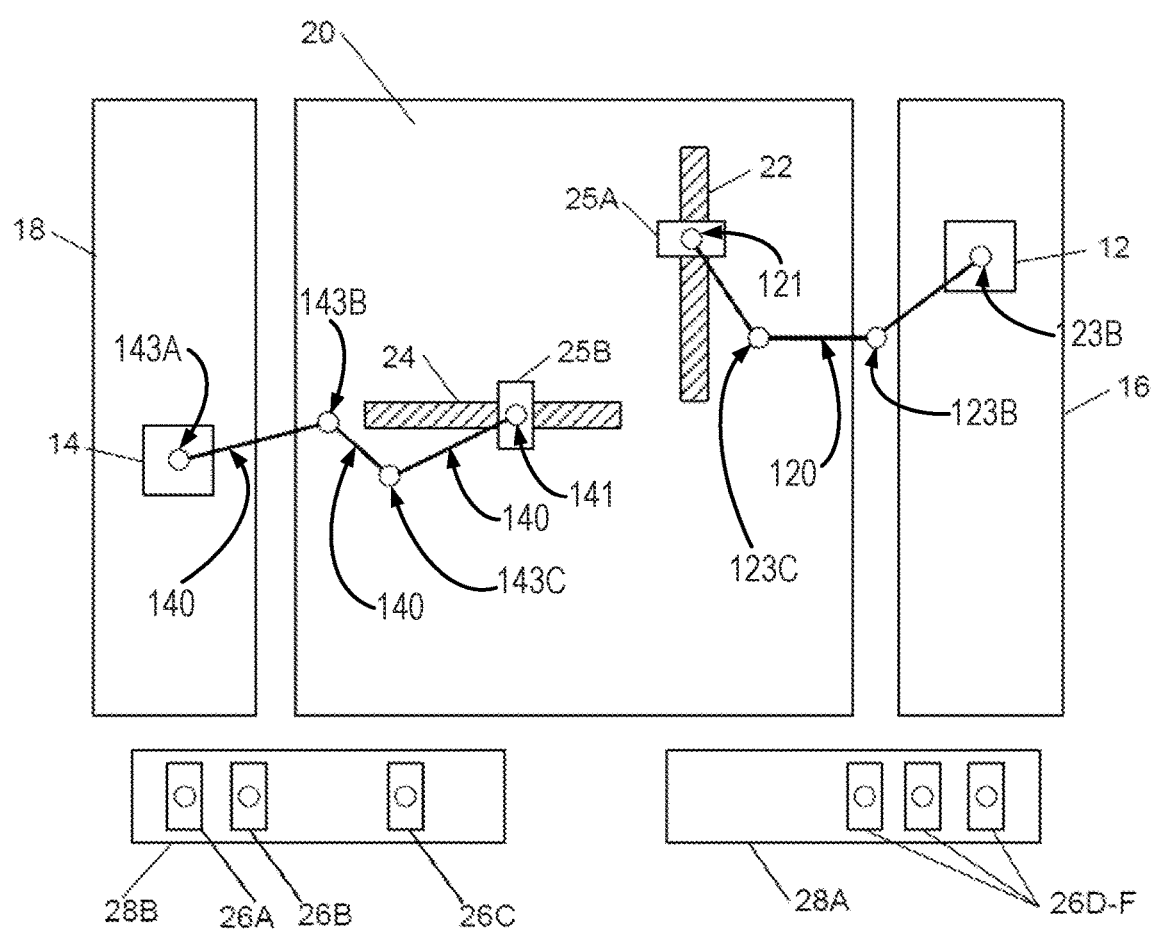
FIG. 1B is a schematic top view illustration of the robotic automated framing construction system shown in FIG. 1A, according to at least one embodiment.

FIGS. 1A-1B are illustrations of a robotic automated framing system 10 having two computer-controlled robots 12 and 14 that can, in one embodiment, facilitate construction of an object, such as a building, or a component of such a structure. More specifically, FIG. 1A is a schematic side view illustration of a robotic automated framing system 10 having two computer-controlled robots 12 and 14, according to one embodiment. FIG. 1B is a schematic top view illustration of the robotic automated framing construction system 10 shown in FIG. 1A, according to one embodiment. In some examples, the robots 12 and 14 can include robot arms, e.g., computer-controlled robot arms.

A computer (or a computer controller implemented by at least one processor) 101 controlling the robotic automated framing system 10 receives instructions stored in a computer-readable medium (e.g., a non-transitory computer-readable medium, such as a computer memory) and executes the instructions to operate the robotic automated framing system 10. In one embodiment, the controller 101 is communicatively coupled to each of the robots 12 and 14 via communication technology 103. For example, and in response to the controller 101 of the robotic automated framing system 10 processing received computer-readable instructions, the controller 101 causes each robot 12 and 14 to move along a respective track 16 and 18, and access any portion of a surface of a work station 20. For this example, the controller 101 communicates instructions via communication technology 103 to one or both of the robots 12 and 14 that cause operation of the robot(s) 12 and 14. Communication technology 103 can be or include a wired, wireless, or other computer network. Communication technologies are described in further detail below in connection with FIG. 7.

As shown in FIGS. 1A-1B, each of the robots 12 and 14 includes a respective arm 120 and 140 for accessing the work station 20. In one embodiment, each of the arms 120 and 140 includes a respective, smaller arm 121 and 141 for finer movements. In some examples, the arms 120, 140, 121, 141 can include electric arms. Examples of suitable robots for robots 12, 14 can be any suitable robot manufactured by KUKA™ Robotics Corporation, such as any of the KR Agilus™ robots, KR Cybertech™ robots, KR Iontec™ robots, KR Quantec™ robots, KR Fortec™ robots, KR Scara™ robots, and other KUKA™ industrial robots. Examples of suitable robots for robots 12 and 14 can include a ABB IRB 6640 robot, and/or the Fanuc R2000ic robot, among other industrial robots. Although exemplary robots for robots 12, 14 are described herein, any suitable and/or applicable robot can be used.

In one embodiment, each of the robots 12 and 14 includes a respective sensor suite for positioning and stability control. For example, and as shown in FIG. 1A, the robot 12 includes a sensor suite with sensors 123A-123C and the robot 14 includes a sensor suite with sensors 143A-143C. One or both these sensor suites can include a communication logic/module/device (not shown) to communicate sensor data with the controller 101. Such a communication logic/module/device can be a transmitter, a transceiver, or any other suitable communication technology known in the art. Additional details about sensors are provided below in connection with FIG. 2.

The robots 12 and 14 work cooperatively, such as to align, fasten, and/or join two pieces 22 and 24 of building material. The robots 12 and 14 can select different tools 25A-25B or 26A-26F from tool mounts 28A-28B to facilitate aligning, fastening, and/or joining the two pieces 22 and 24 of building material. The tools 25A-25B can include swappable tools for welding, cutting, clamping and/or printing.

Each of the two pieces 22 and 24 of building material can be made of, at least in part, lumber, metal, plastic, any suitable type of building material known in the art, or any combination thereof. With specific regard to the description provided herein in connection with FIGS. 1A-7 and the rest of the present disclosure, each of the pieces 22 and 24 is a piece of lumber. The description provided herein sets forth lumber as an illustrative—as opposed to exhaustive—example of the constituent material of the pieces 22 and 24 and. In other words, each of the pieces 22 and 24 may be or include a material that is the same as or different from the other piece's material. For an illustrative example, each of the pieces 22 and 24 of building material is or includes a piece of lumber. For another illustrative example, the piece 22 is or includes a piece of lumber and the piece 24 is or includes a piece of plastic. Other unenumerated examples are possible. In some embodiments, one or both of the pieces 22 and 24 is a combination of any suitable building material known in the art.

In one embodiment, one or both robots 12 and 14 may select (e.g., grip, etc.) the pieces 22 or 24 of building material. For example, and as shown in FIG. 1B, the robot 12 may select the piece 22 using a tool 25. For another example, and as shown in FIG. 1B, the robot 14 may select the piece 24 using a tool 25. The tool 25 can be a tool (sometimes referred to as an end effector herein) capable of being selected from a variety of tools 26 and controlled by the robot 12 or 14 to manipulate or process one or both of the pieces 22 and 24. In one embodiment, the tool 25 can be a gripper end effector 25A or 25B. For this example, and as shown in FIG. 1B, the robot 12 on the track 16 selects and controls a gripper end effector 25A to grip the piece 22 and the robot 14 on the track 18 controls a gripper end effector 25B to grip the piece 24. In one embodiment, one or both of the gripper end effectors 25A-25B includes at least one gripper or finger for gripping the piece 22 or 24. In some embodiments, the robots 12, 14 are configured to detect, and/or respond to a current position and/or current location of the building materials 22, 24. The robots 12, 14 can include software and/or hardware configured to detect, and/or respond to the position and/or location of the building materials 22, 24. In some examples, the robots 12, 14 can use computer vision and/or machine vision software and/or hardware to detect, and/or respond to the current position and/or current location of the building materials 22, 24. The robots 12, 14 can be configured to determine a suitable action, plan and/or path to be implemented based on the current position of the building materials 22, 24. The robots 22, 24 can be configured to sense and/or plan an action on-the-fly based on the current position and/or current location of the building materials 22, 24. In one example, the robots 12, 14 can use computer vision and/or machine vision software and/or hardware to plan and/or take action on-the-fly based on the current position and/or current location of the building materials 22, 24.

As shown in FIG. 1B, one or both of the robots 12 and 14 may be capable of selecting and attaching one of a variety of tools 25A-25B and 26A-26F from one or more tool mounts 28A-28B accessible by one or both of the robots 12 and 14. For example, the robot 12 can select and attach one or more of tools 26D-26F from the tool mount 28A, while the robot 14 can select and attach one or more of tools 26A-26C from the tool mount 28B. The selection of a tool by any one of the robots 12 and 14 can be performed using robotic tool changers, which are well known in the art. Robotic tool changers allow any one of robots 12 and 14 to interface with a variety of tools 25A-25B or 26A-26F on tool mounts 28A-28B. The tool changers can be attached to one end of the robots 12, 14. The tool changer can be configured to receive tools 25A-25, 26A-26F, e.g., the tool changers can be configured to connect and/or disconnect different tools.

Each of the tools 25A-25B and 26A-26F can be any tool associated with or used for construction of structures or their components known in the art, such as a gripper tool or end effector (e.g., a clamping tool or clamp, a vacuum gripper, etc.), an alignment tool, a measuring tool (e.g., laser range finder, depth sensor, etc.), a joining or coupling tool (e.g., a nailing tool, a gluing tool, a welding, etc.), an encapsulation tool (e.g., a wrapping tool, a sheathing tool, a trimming tool, etc.), a cutting tool (e.g., a router, a saw, jigsaw etc.), a finishing tool (e.g., a jointer, a planer, etc.), a painting tool (e.g., a paint application machine, etc.), a power tool, any other tool known in the art, or any combination thereof. For example, one or more of the tool(s) 25A-25B and 26A-26F can be: a tool capable of creating joints, such as a ninety degree (90°) joint or any other degree joint; a tool capable of bringing multiple studs together to nail them through the face of a stud; a tool for picking up sheathing; a tool for encapsulating a piece of building material in sheathing; a tool for trimming sheathing; a tool for finishing a piece of material; a tool for cutting a piece of building material; a tool for performing nailing operations without an attached clamping; a spray foam insulation tool; any other suitable tool; or any combination thereof.

Figure 2A:
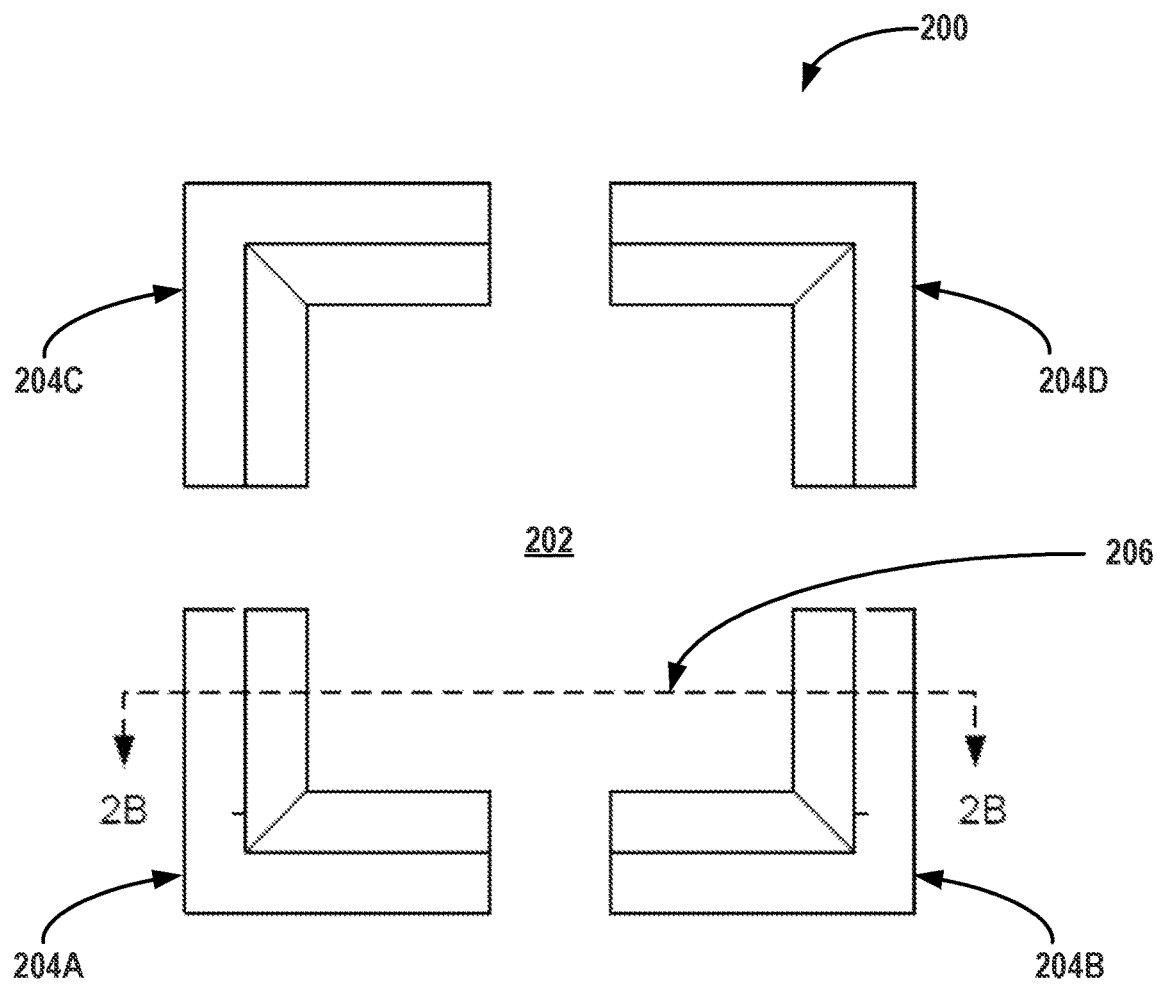
FIG. 2A is a schematic top view illustration of a tool mount, according to at least one embodiment.
Figure 2B:
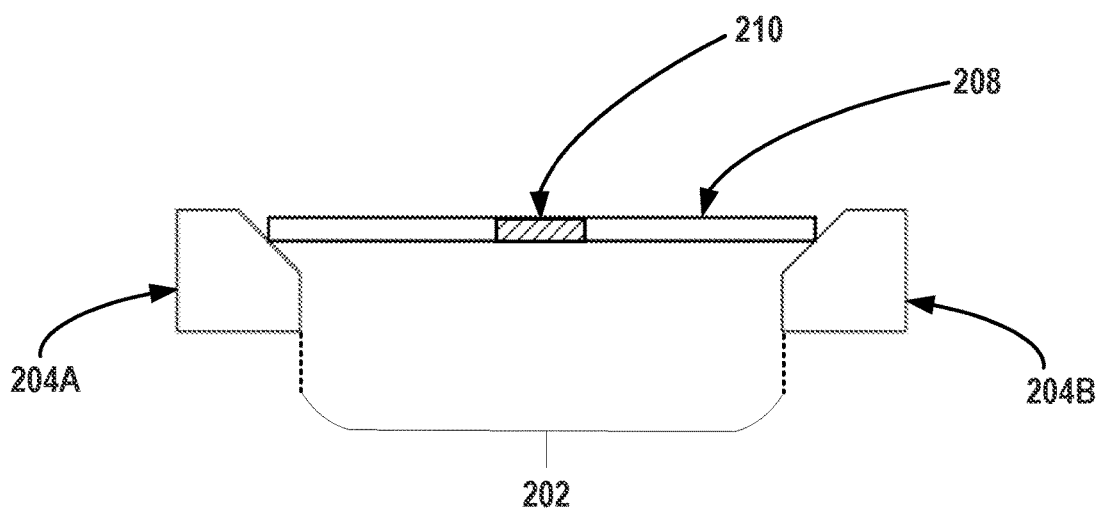
FIG. 2B is a schematic section view illustration of the tool mount shown in FIG. 2A with a tool disposed therein, according to at least one embodiment.

FIGS. 2A-2B are respective top and side view illustrations of a tool mount 200 in accordance with one or more embodiments. For example, and in one embodiment, the tool mount 200 can be similar to or the same as one or both of the tool mounts 28A-28B described above in connection with FIGS. 1A-1B. In some examples, the tool mount can include a kinematic mount.

With specific regard now to FIG. 2A, a schematic top view illustration of an embodiment of the tool mount 200 is shown. In one embodiment, the tool mount 200 includes four support structures 204A-204D. Each of the support structures 204A-204D can be a slat, a plate, any other similar support structure known in the art, or any combination thereof.

As shown in FIGS. 2A and 2B, the tool mount 200 also includes a landing area 202. In one embodiment, the four support structures 204A-204D are arranged such that the landing area 202 is created in the middle of the four support structures 204A-204D.

Referring now to FIG. 2B, a schematic side view illustration of an embodiment of the tool mount 200 along cross-section line 206 of FIG. 2A is shown. In FIG. 2B, two support structures 204A-204B are arranged such that the landing area 202 is disposed between the two support structures 204A-204B. Furthermore, and in the embodiment shown in FIG. 2B, a tool 208 may be disposed in the landing area 202. In this embodiment, the tool 208 resides on a top side of each of the two support structures 204A-B. The tool 208 can be any suitable tool known in the art, such as any of the tools described above in connection with FIGS. 1A-1B or described below in connection with FIGS. 3A-6. Other embodiments of the tool mount 200 shown in FIG. 2B are not so limited. For example, a plurality of tools 208 (e.g., more than one tool 208) may be disposed in the landing area 202.

In one embodiment, the tool(s) 208 may be similar to or the same as one or more of the tools 25A-25B and 26A-26F described above. In embodiments that include a plurality of tools 208, each of these tools 208 can be swapped out for any of the other tools 208 by a robot (e.g., one or both of robots 12 and 14 described above).

In one embodiment, at least one of the tools 208 includes a sensor 210 that allows for sensing one or more characteristics of a piece of building material, one or more characteristics of the tool 208 or another unattached tool, and/or one or more characteristics of an environment that the tool 208 is in or will interact with. In one embodiment, a computer-controlled robot (e.g., robot 12 and/or 14 of FIGS. 1A-1B, etc.) operating the tool(s) 208 uses the sensor 210 to determine information about one or more characteristics of a building material, the tool 208, another tool, and/or an environment associated with the computer-controlled robot and/or the tool 208. Such a sensor 210 is, in one embodiment, capable of sensing a three-dimensional (3D) environment, depth, position, tilt, pressure, proximity, temperature, force, vibration, color, humidity, moisture, light, any other suitable sensor known in the art, or any combination thereof. Non-limiting examples of a sensor 210 include an RGB-D sensor, a gyroscope, an infrared sensor, a photo transistor, a lidar sensor, a radar sensor, an image or imaging sensor, any other suitable sensor known in the art, and any combination thereof. In some scenarios, a sensor can be any of the Infineon XENSIV™ sensors, Infineon Rasic™ sensors, Infineon REAL3™ sensors, Infineon MOTEON™ sensors, Intel Realsense sensors, Zed 2 sensor, Zivid sensor, or any other suitable sensors manufactured by Infineon Technologies AG.

Figure 3A:
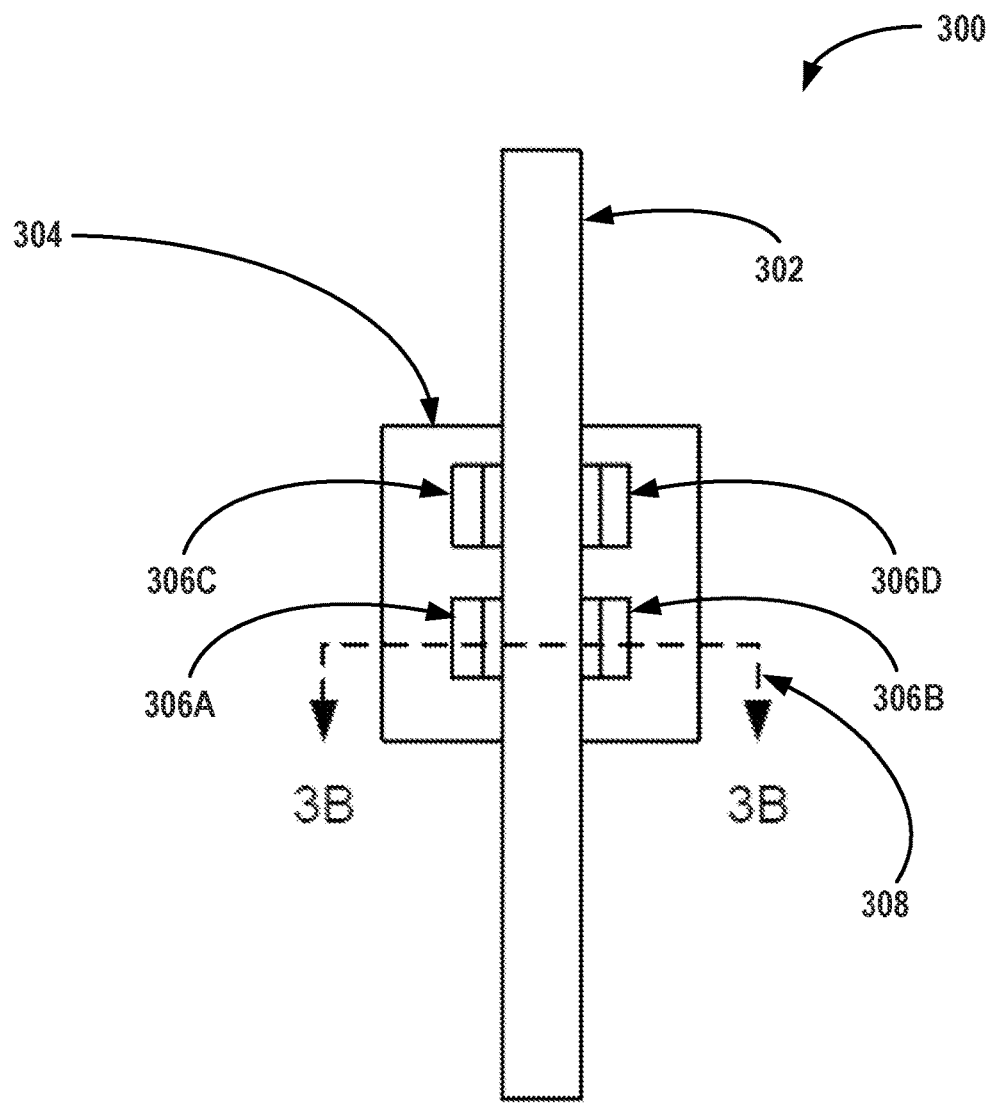
FIG. 3A is a schematic top view illustration of a gripper tool holding a piece of building material, according to at least one embodiment.
Figure 3B:
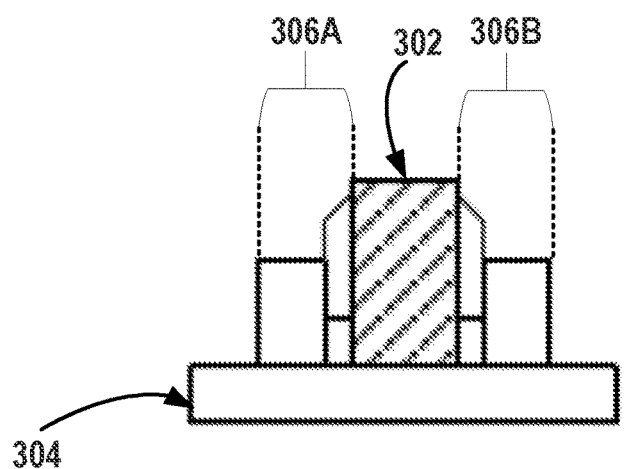
FIG. 3B is a schematic section view illustration of the gripper tool shown in FIG. 3A with the piece of building material disposed therein, according to at least one embodiment.

FIGS. 3A-3B are respective top and side view illustrations of a gripper tool 300 holding a piece of building material 302, according to at least one embodiment. For example, and in one embodiment, the gripper tool 300 can be similar to or the same as one or both of the gripper end effectors 25A-25B described above in connection with FIGS. 1A-1B.

Referring now to FIG. 3A, a schematic top view illustration of an embodiment of the gripper tool 300 holding a piece of building material 302 is shown. The building material 302 can be any type of building material known in the art, such as any of the building materials described above in connection with FIGS. 1A-1B.

In one embodiment, the gripper tool 300 shown in FIG. 3A having a base 304 and four moveable clamps 306A-306D. Each of the moveable clamps 306A-306D can be any type of computer-controlled clamp known in the art, such as a computer-controlled band clamp, bar clamp, C-clamp, G-clamp, any other suitable clamp known in the art, or any combination thereof.

With regard now to FIG. 3B, a schematic side view illustration of an embodiment of the gripper tool 300 along cross section line 308 of FIG. 3A holding a piece of building material 302 is shown. In the embodiment illustrated in FIG. 3B, each of two computer-controlled clamps 306A-B are moved to grip a side of the building material 302 such that the building material 302 is held in place on the base 304 of the gripper tool 300. In this way, the building material 302 can be held in place so that additional operations, such as an alignment operation and/or a joining operation, can be performed to align and/or join the building material 302 to another building material by one or more embodiments of a robotic automated framing system described herein.

Figure 4:
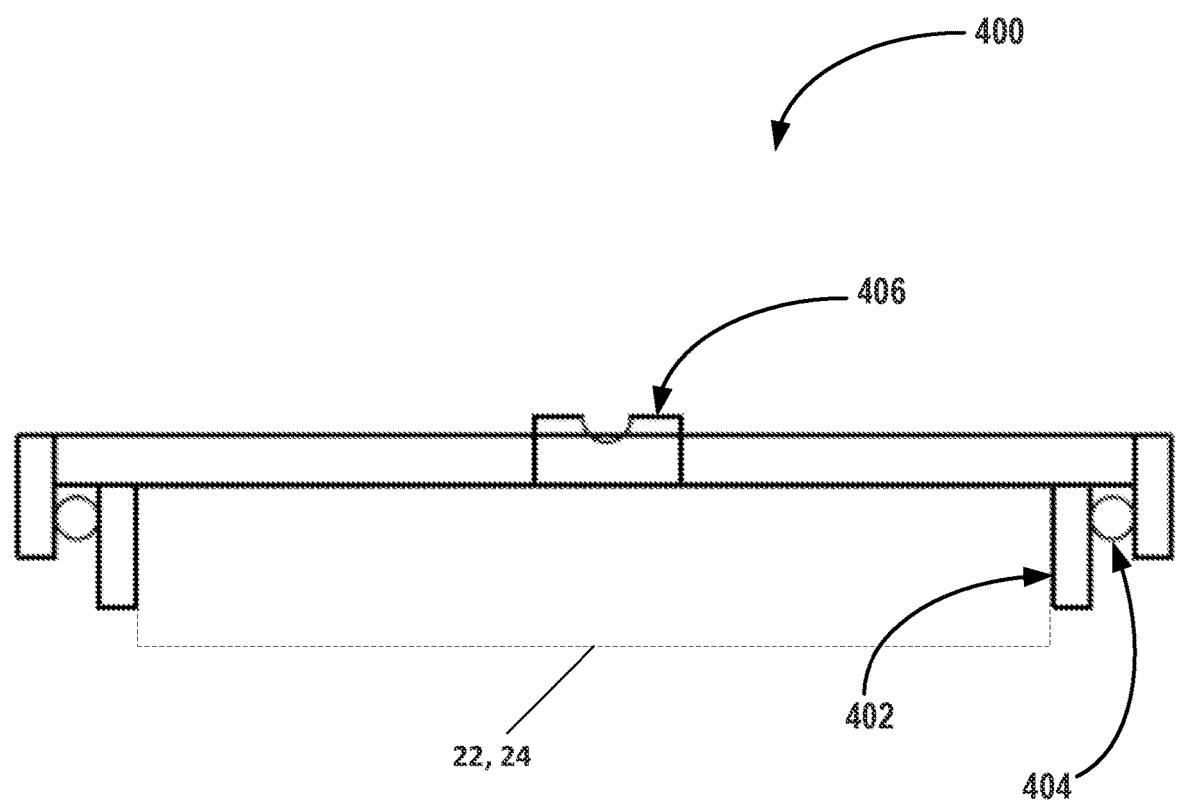
FIG. 4 is a schematic side view illustration of a clamp, according to at least one embodiment.

FIG. 4 is a schematic side view illustration of a clamp 400, according to at least one embodiment. The clamp 400 can be a computer-controlled clamp that is moveable. For example, and in one embodiment, the clamp 400 can be similar to or the same as any of the computer-controlled clamps 306A-D described above in connection with FIGS. 3A-3B.

In one embodiment, and as shown in FIG. 4, the clamp 400 includes a clamping surface 402, a clamping mechanism 404, and a robot grasp point 406. The clamp 400 can include a ball and screw clamping mechanism. In some examples, the clamp 400 can be configured to select, hold, pick-up and/or grasp the pieces 22, 24 described in FIGS. 1A and 1B. The clamp 400 can include the gripper end effector 25A or 25B described in FIG. 1B. The robots 12, 14 described in FIG. 1B can select and control one or more clamps 400 to grip the pieces 22, 24. Furthermore, the clamps 400 can include at least one gripper and/or finger for gripping the pieces 22, 24.

Figure 5:
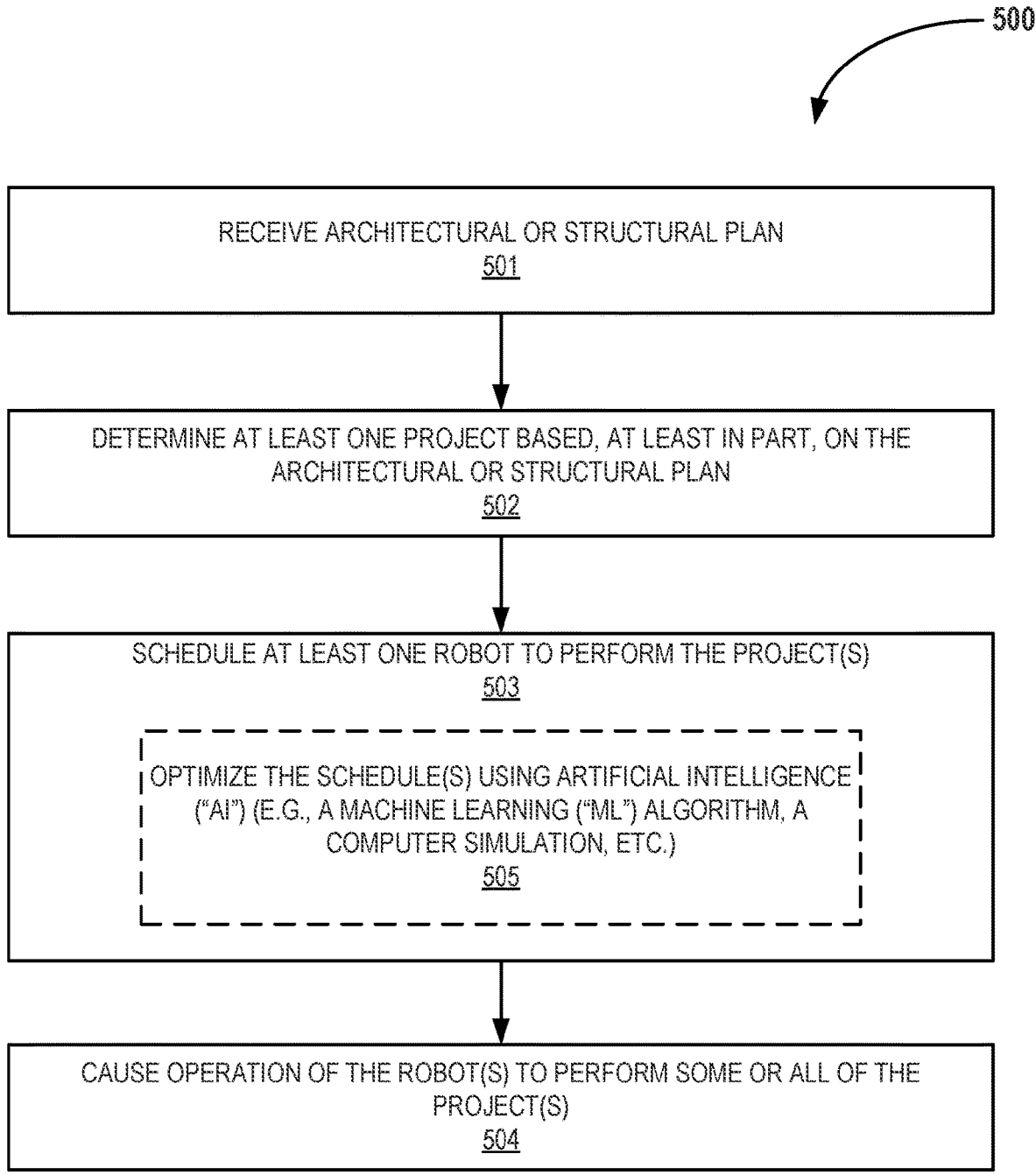
FIG. 5 is a flowchart illustrating of a process of automated framing construction, according to at least one embodiment.

FIG. 5 is a flowchart illustrating of a process 500 of automated framing construction, according to at least one embodiment. The process 500 can be performed by an embodiment of a robotic automated framing system described herein, such as the robotic automated framing system 10 described above in connection with FIGS. 1A-1B. Furthermore, one or more operations of the process 500 can be performed by at least one of the constituent components of a robotic automated framing system, such as the constituent components described above in connection with FIGS. 1A-4. These constituent components include, but are not limited to, one or more of: the robot 12; robot 14; tool 25 (e.g., one or both of the gripper end effectors 25A-25B); one or more of the tools 26A-26F and 208; one or more of tool mounts 28A-28B and 200, one or more of mount support structures 204A-D; sensor 210; gripper tool 300; one or more of the clamps 306A-D and 400; any other suitable constituent component known in the art; and any combination thereof.

The process 500 begins at block 501. Here, the robotic automated framing system may receive an architectural or structural plan. For example, and in one embodiment, a computer controlling the robotic automated framing system may receive the architectural or structural plan in the form of computer-readable instructions. Such a computer can receive the architectural or structural plan via any technique or technology known for communicating computer-readable instructions, such as communications that involve computer networks (e.g., the Internet, a local area network (LAN), a wide area network (WAN), a metropolitan area network (MAN), any other telecommunications network, any combination thereof, etc.). Examples of communication techniques/technologies include, but are not limited to, wired communication technologies, wireless communication technologies, any other suitable communication technologies, or any combination thereof. Examples of wired communication technologies include, but are not limited to, telephone networks, cable television or internet access, and fiber-optic communication. Examples of wireless communication technologies include, but are not limited to, radio waves, Bluetooth, mobile broadband, Wi-Fi, and/or satellite communication.

The architectural or structural plan can include information (e.g., operations, steps, constraints, etc.) for implementing or directing construction of a building structure (or a component of such a structure). In one embodiment, the architectural or structural plan includes one, some, or all of the following: (i) one or more characteristics of a building material (e.g., a dimension, a depth, a material type, color information, etc.); and (ii) a building code (e.g., at least one rule specifying a standard for constructed building structures or their components, etc.). In some examples, the building code can include (i) at least one technique for processing of a building material to construct a building structure (e.g., a joining technique (nailing, clamping, gluing, welding, etc.), a sheathing technique, a cutting technique, etc.); and (ii) any other information known in the art for construction of a building structure.

At least one embodiment of an architectural or structural plan includes a building code. In one embodiment, a building code includes one or more standards for building structures, including placement, size, usage, wall assembly, fenestration size/location, an egress rule, size/location of a room, foundation dimensions/types/elevation, floor assembly, roof structure/assembly, energy efficiency, stairs and halls, mechanical requirements or constraints, electrical requirements or constraints, plumbing requirements or constraints, site drainage and storage requirements or constraints, appliance requirements or constraints, lighting requirements or constraints, fixtures standards, occupancy rules, and/or swimming pool regulations. In one embodiment, a building code includes rules regarding parking and traffic impact. Other information in an embodiment of a building code includes fire code rules to minimize the risk of a fire and to ensure safe evacuation in the event of such an emergency. Additional building code information includes requirements for: (i) earthquake (seismic code), hurricane, flood, and tsunami resistance; (ii) specific building uses (for example, storage of flammable substances, or housing a large number of people); (iii) energy provisions and consumption; (iii) specifications on components; (iv) allowable installation methodologies; (v) minimum and maximum room ceiling heights; (vi) locations and sizes of exits (e.g., emergency exits, etc.); (vii) any other suitable information known in the art; and (viii) any combination thereof.

The process 500 then moves to block 502. Here, the robotic automated framing system determines at least one project to be performed based, at least in part, on processing the architectural or structural plan. In some examples, the architectural or structural plan can include an architectural drawing or structural drawing. In one embodiment, the robotic automated framing system may process the architectural or structural plan to determine that the plan is for construction of a building structure, and that the construction is broken down into one or more projects. For example, and in one embodiment, the robotic automated framing system determines that the architectural or structural plan details construction of a wall and that the construction of the wall is to be broken down into several projects. In this example, each project includes construction of a wall panel that is subsequently joined together with the other wall panels from the other projects to form the wall. The joining of multiple wall panels can be referred to as a panelization process. In some examples, each of the individual wall panels that make-up the wall can be formed at a single work station. The forming of the wall from the wall panels can be performed during a project or over multiple projects. The joining of the individual panels to form the wall can be performed at the same workstation. The joining of the individual wall panels to form the wall can be performed in the same project for forming the individual wall panels.

In some embodiments, since there can be multiple ways for constructing a building structure which can be made up of the projects, the order and/or configuration of the building structure and of the projects that make up the building structure can directly impact the performance of the robotic automated framing system. In addition, because there can be many different ways the building structure can be made up of projects, e.g., a wall can be constructed of multiple panels, it can be challenging to determine an optimal building structure. Thus, the robotic automated framing system can be configured to evaluate project configurations to find a target project configuration and/or an optimized project configuration. In some examples, such a configuration can be made up of a single or more than one project. In one example, the target configuration can be used to optimize lumber usage, robot operation, and/or a number of other building construction factors.

In some embodiments, the robotic automated framing system can be configured to select a project having a particular framing configuration of a building structure that minimizes a building cost provided certain building constraints and/or robot constraints. The output block 502 can automatically specify a location of materials such as, but not limited to, nails, studs, sheathing, and/or other materials used in the framing process. Block 502 can be configured to allow a user to set criteria for a target project selection, e.g., block 502 may not require the user to provide specific information, e.g., where exactly a stud is needed to be placed. Instead, at block 502, the robotic automated framing system can be configured to request a user for desired building information and/or criteria, make an appropriate determination based on the provided criteria, and construct the building structure and/or projects based on the determination made. In some embodiments, a project, panel configuration, and/or panel definition can be used to schedule the physical operations of the robotic automated framing system. In one example, the robotic automated framing system can be configured to assemble a wall panel in a particular order based on a physical definition of a wall panel provided by the user, and subsequently, execute a build procedure based on the physical definition.

After block 502, the process 500 proceeds to block 503. Here, the robotic automated framing system schedules at least one robot to perform the project(s) determined at block 502. In one embodiment, the robotic automated framing system includes a scheduler to perform the operation(s) specified by block 503. The scheduler can be implemented using hardware, software, or a combination of both.

In one embodiment, a schedule is a sequence of high-level commands for instructing a computer-controlled robots of the robotic automated framing system to perform a project as part of the process of constructing a building structure. Scheduling, in one embodiment, includes determining one or more computer-controlled robots (e.g., at least one of the robots described above in connection with FIGS. 1A-1B, etc.) to assist with performing the project(s). In one embodiment, scheduling includes determining one or more tools (e.g., at least one of the tools described above in connection with FIGS. 1A-4, etc.) to assist with performing the project(s).

Some embodiments of block 503 include optional block 505. In these embodiments, the robotic automated framing system performs block 505 to optimize one or more of the schedules determined at block 503. For example, and in one embodiment, the robotic automated framing system optimizes the schedule(s) using artificial intelligence ("AI"). In one embodiment, the AI can be implemented using any known AI technique, such as machine learning ("ML"), deep learning, natural language processing ("NLP"), robotics, expert systems, and/or fuzzy logic. For example, and in one embodiment, one or more ML algorithms can be used to optimize the schedule(s). For another example, and in one embodiment, one or more computer simulations can be used to optimize the schedule(s). In one embodiment, the schedule(s) are optimized to minimize costs associated with construction. For example, optimizing an amount of building material used to construct a wall. For another example, optimizing an amount of building material used to construct a wall or wall panel using an available—as opposed to theoretical—amount of building material. In some embodiments, the schedule(s) are optimized using a classical planning system. In some examples, the classical planning system includes a heuristic search algorithm. These algorithms can be used to represent the schedule(s) as a set of possible paths as applied in a computational graph. Each edge of the computational graph can be considered as an action, each node of the computational graph can be understood to be a state of the schedule. Thus, finding a target path in the computational graph can correspond to a sequence of actions that can be taken by a robot of the robotic automated framing system to get from a start state to an end state of the schedule. The robotic automated framing system can be configured to determine which states are valid and/or optimized for the schedule, and a physics simulator can be used to further refine and/or determine if the action of the state will result in the desired outcome, or if the action will result in an undesired outcome.

A schedule has a sequence of high-level commands for instructing a computer-controlled of the robotic automated framing system to perform a project as part of the process of constructing a building structure (or a component of such a structure). Each high-level command corresponds to one or more tasks that must be completed in order to construct a building component. At block 504, and in one embodiment, at least one computer of the robotic automated framing system processes each high-level command to determine at least one task necessary to achieve the high-level command. Additionally, and in one embodiment, at least one computer-controlled robot of the robotic automated framing system performs or executes the determined task(s) to achieve the high-level command.

In some embodiments, the robotic automated framing system can be configured to perform all the tasks associated with constructing a component of the building structure. In one example, all the steps for constructing the component can be performed at the work station 20. This example is in contrast to separately creating sub-components, e.g., each sub-component pre-built at separate work stations, and constructing the component at the work station 20 from the separately created sub-components. In a particular example, a sub-component can include a window or door, and the component of the building structure can include a wall made up of individual windows or doors. The sub-component can be formed during a project, and during the same project, each of the individual sub-components can be joined to form a wall panel. The forming of the sub-components, and the joining of the sub-components, can be performed at the same work station.

Figure 6:
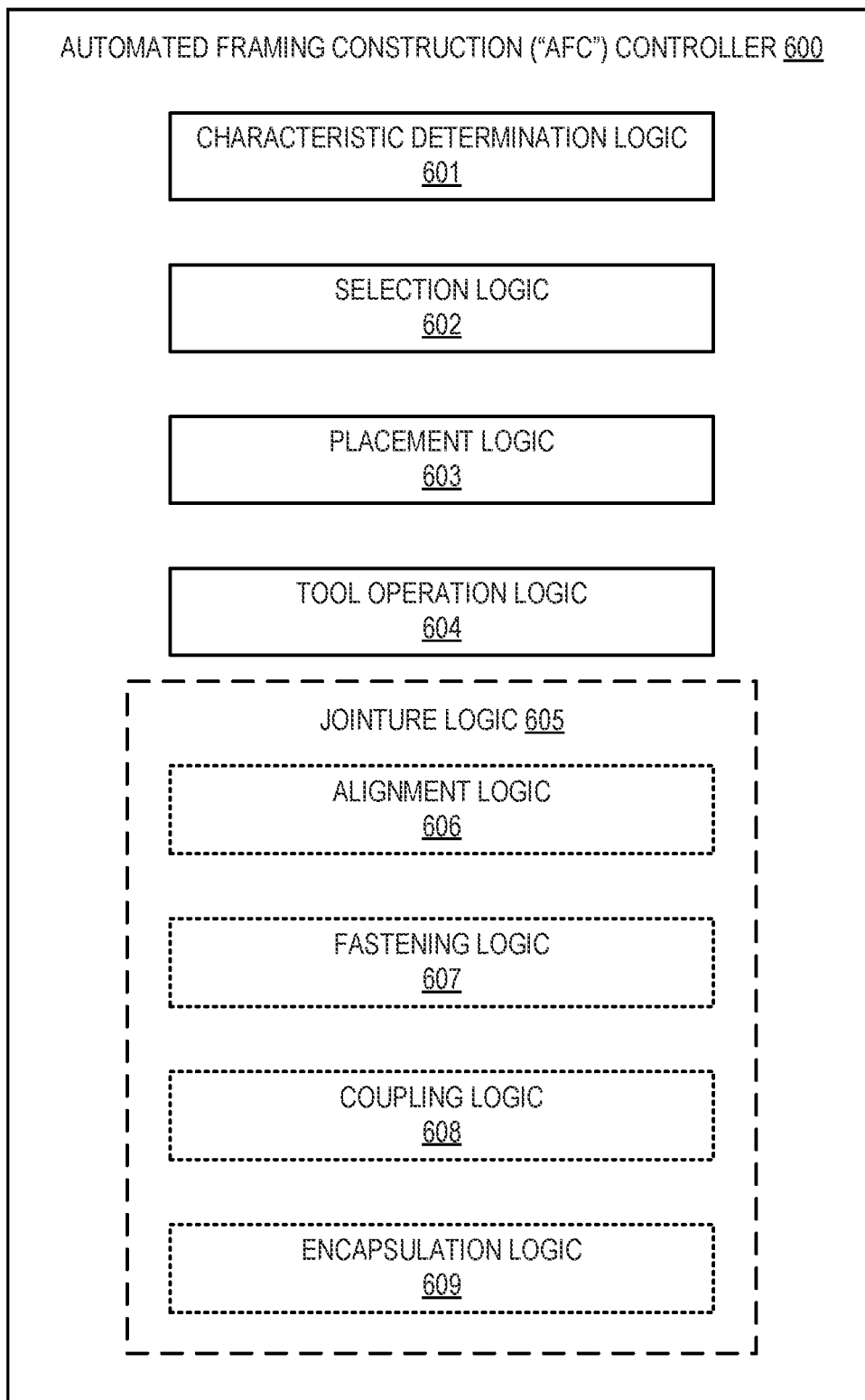
FIG. 6 is a schematic diagram of controller comprising logic capable of implementing automated framing construction using at least one robot to construct a building structure, according to at least one embodiment.

FIG. 6 is a schematic diagram of an automated framing construction (AFC) controller 600 with logic 601-609 capable of performing automated framing using at least one robot to construct a building structure, according to at least one embodiment. The AFC controller 600 can be communicatively coupled to a robotic automated framing system, such as the system 10 described in FIGS. 1A-1B. In some scenarios, the AFC controller 600 is similar to or the same as the controller 101 described above in connection with FIGS. 1A-1B. Furthermore, the AFC controller 600 can be a computer, such as one or more processors implemented via hardware, software, or a combination thereof. As used herein, the term "controller" encompasses the terms "computer controller," "computer," "computing system," "processor," any of variations or logical substitutes of the preceding terms, and the like.

One embodiment of the AFC controller 600 can be communicatively coupled to logic 601-609. Other embodiments, however, are not so limited. That is, the AFC controller 600 can have or be communicatively coupled to any number of logic. For example, the AFC controller 600 has or is communicatively coupled to any number of logic that is less or more than the number of logic 601-608 shown in FIG. 6. Furthermore, any logic that is part of or communicatively coupled to the AFC controller 600 can be designed, configured, executed, and/or implemented to perform any suitable process, operation, or task known in the art. Nonlimiting examples of such a process, an operation, or a task are described below in connection with FIG. 6. As used herein, the term "logic" refers to any hardware, software, or combination thereof capable of performing a specific process, operation, or task. Furthermore, the term "logic" encompasses the terms "module," "program," "file," "instructions," "circuit," any of variations or logical substitutes of the preceding terms, and the like.

In one embodiment, the AFC controller 600 shown in FIG. 6 has or is communicatively coupled to a characteristic determination logic 601 for determining positional and/or other real-world information associated with a tool or a piece of building material from a designated area. The tool can be any of the tools described above in connection with any one of FIGS. 1A-5, such as tools 25A-25B, 26A-26F, 208, 300, and 400. The piece of building material can be any of the pieces of building material described above in connection with any one of FIGS. 1A-5, such as pieces 22, 24, and 302. The designated area can be a pick-up area (e.g., an area where a tool or piece of building material can be picked up from) or a drop-off area (e.g., an area where a tool or piece of building material is to be dropped off at). A pick-up or drop-off area includes, but is not limited to, a tool mount and a work station. Examples of a tool mount are described above in connection with FIGS. 1A-4, such as tool mounts 28A-28B and 200. Examples of a work station are described above in connection with FIGS. 1A-4, such as work station 20.

As alluded to above, one embodiment of the characteristic determination logic 601 can cause or be configured to cause a robot 12 or 14 of a robotic automated framing system 10 to determine positional information (e.g., a location, etc.) and/or other real-world information associated with a tool or a piece of building material from a designated area. More specifically, the characteristic determination logic 601 can cause or be configured to cause a robot 12 or 14 of a robotic automated framing system 10 to acquire information about the tool or piece of building material using at least one sensor. One example of such a sensor is the sensor 210 described above in connection with at least FIG. 2B. The characteristic determination logic 601 can further cause or be configured to cause the robot 12 or 14 to determine positional and/or other information associated with the tool or piece of building material using, at least in part, the acquired sensor information. Examples of the determined information include, but are not limited to, any suitable characteristic of the tool or piece of building material. A characteristic includes any distinguishing trait, quality, or property of the tool or piece of building material, such as its location, depth, dimension (e.g., height, weight, length, size, magnitude), color, moisture content, magnetic property, metallic content, any other suitable characteristic known in the art, or any combination thereof.

The AFC controller 600 can have or be communicatively coupled to a selection logic 602 for selecting and/or picking up at least one tool and/or piece of building material from a pick-up location, such as a tool mount, a work station, any other suitable designated area, or any combination thereof. In one embodiment, the selection logic 602 causes or is configured to cause a robot 12 or 14 of a robotic automated framing system 10 to pick up at least one tool or piece of building material from a pick-up location. In one embodiment, the selection logic 602 causes the robot 12 or 14 to select and use an appropriate pick-up tool in response to the robot 12 or 14 performing one or more of the operations associated with the characteristic determination logic 601. The robot 12 or 14 may use any suitable pick-up tool known in the art for picking up objects. Examples of such a pick-up tool employ vacuum technology (e.g., a vacuum gripper, etc.), magnetic technology (e.g., a magnetic pick-up tool, etc.), mechanical pick-up technology (e.g., a hinge, a mechanical gripper, etc.), or any other suitable technology or combination of technologies known in the art.

As shown in FIG. 6, the AFC controller 600 can have or be coupled to a placement logic 603 for selecting and/or placing at least one tool or piece of building material in or on a drop-off location, such as a tool mount, a work station, any other suitable designated area, or any combination thereof. In one embodiment, the placement logic 603 causes or is configured to cause a robot 12 or 14 of a robotic automated framing system 10 to place at least one tool or piece of building material in or on a drop-off location. In one embodiment, the placement logic 603 causes the robot 12 or 14 to select and use an appropriate placement tool in response to the robot 12 or 14 performing one or more of the operations associated with the characteristic determination logic 601. The robot 12 or 14 may use any suitable placement tool known in the art for placing objects. Examples of such a placement tool employ vacuum technology (e.g., a vacuum gripper, etc.), magnetic technology (e.g., a magnetic placement tool, etc.), mechanical pick-up technology (e.g., a hinge, a mechanical gripper, etc.), or any other suitable technology or combination of technologies known in the art.

Referring again to FIG. 6, one embodiment of the AFC controller 600 having or being communicatively coupled to a tool operation logic 604 is shown. The tool operation logic 604 can enable operating a tool. For example, and in one embodiment, the tool operation logic 604 causes or is configured to cause a robot 12 or 14 of a robotic automated framing system 10 to operate a tool, such as a tool that was picked up in response to the robot 12 or 14 performing one or more operations associated with the selection logic 602. In one embodiment, the tool operation logic 604 causes or is configured to cause a robot 12 or 14 of a robotic automated framing system 10 to operate a tool by attaching the tool to a work station, detaching the tool from a work station, and/or executing a function of the tool. For example, the tool operation logic 604 can cause or be configured to cause a robot 12 or 14 operating an attached coupling tool (e.g., a nailing tool, a nail plate, a glue gun, a gluing tool, a welding tool, a fusing tool, a combination thereof, etc.) to execute one or more coupling operations (e.g., a nailing operation, application of glue, a welding operation, a fusing operation, a combination thereof, etc.) on one or more pieces of building material. For another example, the tool operation logic 604 can cause or be configured to cause a robot 12 or 14 operating an attached fastening tool (e.g., a clamp, a gripper end effector, a nail plate, a combination thereof, etc.) to execute one or more fastening operations (e.g., fastening or pressing two or more pieces of building material together, etc.). For yet another example, the tool operation logic 604 can cause or be configured to cause a robot 12 or 14 operating an attached encapsulation tool (e.g., a sheathing tool, a cutting tool, a combination thereof, etc.) to execute one or more encapsulation operations (e.g., sheathing a piece of building material or a component of a structure with a sheathing material, trimming any excess sheathing material from the encapsulated piece or component, performing cutting operations, among other operations.).

With regard again to FIG. 6, one embodiment of the AFC controller 600 having or being communicatively coupled to an optional jointure logic 605 is shown. The optional jointure logic 605 can enable joining pieces of building materials together. In one embodiment, the optional jointure logic 605 causes or is configured to cause a robot 12 or 14 of a robotic automated framing system 10 to join pieces of building materials together. The jointure logic can be used to join multiple pieces of building materials at differing angles and/or orientations. The embodiment of optional jointure logic 605 shown in FIG. 6 has or is communicatively coupled to optional alignment logic 606, optional fastening logic 607, optional coupling logic 608, and encapsulation logic 609. Other embodiments of the optional jointure logic 605, however, are not so limited. For example, one embodiment of the optional jointure logic 605 may include any number of logic. That is, the optional jointure logic 605 may include more or less than optional logic 606-609.

The optional alignment logic 606 could, in one embodiment, cause or be configured to cause a robot 12 or 14 of a robotic automated framing system 10 to align two or more pieces of building material together. Alignment can be performed using one or more characteristics acquired in response the robot 12 or 14 performing at least one operation associated with the logic 601. For example, and in one embodiment, a sensor or sensor suite (e.g., sensor 210, etc.) on a tool attached to a robot 12 or 14 (e.g., tool 208, etc.) acquires sensor information (e.g., depth data, color imagery data, etc.) of two unattached pieces of building material in a designated area that the robot 12 or 14 subsequently processes to locate each of the two unattached pieces of building material and align them with one another. Stated differently, the robot 12 or 14 wielding a tool 208 acquires sensor information from a sensor 210 of the tool 208, processes the acquired sensor information to locate two unattached building materials in one or more designated areas, and aligns—using the processed sensor information—the two pieces of building material with each other. In one embodiment, the tool 208 is a fastening tool, an alignment tool, a coupling tool, an encapsulation tool, any other tool or end effector described herein or known in the art, or any combination thereof. In one embodiment, a robot 12 or 14 uses the localization (e.g., locating, etc.) of the two unattached pieces of building material to perform alignment by correcting any deviation in the location(s) of the two pieces of building material. In one example, a tool 208 (e.g., a gripper end effector similar to the one described above in connection with FIGS. 1A-1B) aligns the two pieces of building material in response to correction of the deviation(s).

The optional fastening logic 607 could, in one embodiment, cause or be configured to cause a robot 12 or 14 of a robotic automated framing system 10 to fasten (e.g., clamp, press, hold, secure, etc.) two or more pieces of building material together. Fastening can be performed using any suitable fastening tool, such as a clamp or grip end effector similar to at least one of tools 25A-25B, 26A-26F, 208, and 300 described above in connection with FIGS. 1A-1B. As described above in connection with tool operation logic 604, fastening pieces of building material includes a robot 12 or 14 executing one or more fastening operations (e.g., a clamping operation, a pressing operation, a holding operation, a securing operation, etc.) associated with a fastening tool.

In one embodiment, one or both of the optional logic 606-607 can cause or be configured to cause a robot 12 or 14 to align and/or fasten pieces 22 and 24 together using at least one of tools 25A-25B, 26A-26F, 208, and 300 described above in connection with FIGS. 1A-1B such that at least one surface of the piece 22 is in contact with at least one surface of the piece 24. For example, and in one embodiment, one or both of the optional logic 606-607 causes or is configured to cause a robot 12 or 14 to align and/or fasten pieces 22 and 24 together, using at least one of tools 25A-25B, 26A-26F, 208, and 300, in an orthogonal relationship such that the secured pieces 22 and 24 are perpendicular with respect to one another. As a result, a surface of the piece 22 and a surface of the piece 24 form or intersect at an angle of 90°. The aligned and/or fastened pieces 22 and 24 can be joined using a coupling tool. Alternatively, or additionally, one or more operations may be performed using one or more of the other tools described herein.

Optional coupling logic 608 can also be part of or communicatively coupled to the controller 606. In one embodiment, the optional coupling logic 608 can cause or be configured to cause a robot 12 or 14 of a robotic automated framing system 10 to couple two or more pieces of building material using a coupling tool. As described above in connection with the tool operation logic 604, coupling pieces of building material includes a robot 12 or 14 executing one or more coupling operations (e.g., a nailing operation, application of glue, a welding operation, a fusing operation, etc.) associated with a coupling tool. Such operations include, but are not limited to, nailing pieces 22 and 24 to each other, gluing pieces 22 and 24 to each other, welding pieces 22 and 24 to each other, fusing pieces 22 and 24 to each other, screwing and/or fastening pieces 22 and 24 together, or any other suitable coupling technique known in the art.

In some embodiments, the AFC controller 606 includes an optional encapsulation logic 609 for encapsulating a component of building structure formed from multiple pieces of building material. For example, and in one embodiment, the optional encapsulation logic 609 can cause or be configured to cause a robot 12 or 14 of a robotic automated framing system 10 to encapsulate a component formed from two or more pieces of building material using one or more encapsulation techniques. One example of an encapsulation technique is described above in connection with the tool operation logic 604. For example, and in one embodiment, the optional encapsulation logic 609 can cause or be configured to cause a robot 12 or 14 operating an attached encapsulation tool (e.g., a sheathing tool, a cutting tool, a combination thereof, etc.) to execute one or more encapsulation operations (e.g., sheathing a piece of building material or a component of a structure with a sheathing material, trimming any excess sheathing material from the encapsulated piece or component, a combination thereof, etc.).

Embodiments described herein do not require any operation associated with any one of logic 601-609 of the controller 600 to be performed in any specific order or sequence. For example, and in one embodiment, two or more operations associated with any one of logic 601-609 can be performed sequentially, non-sequentially, in parallel, in any other order known in the art, or in any combination thereof.

Hardware and Software Implementations

Figure 7:
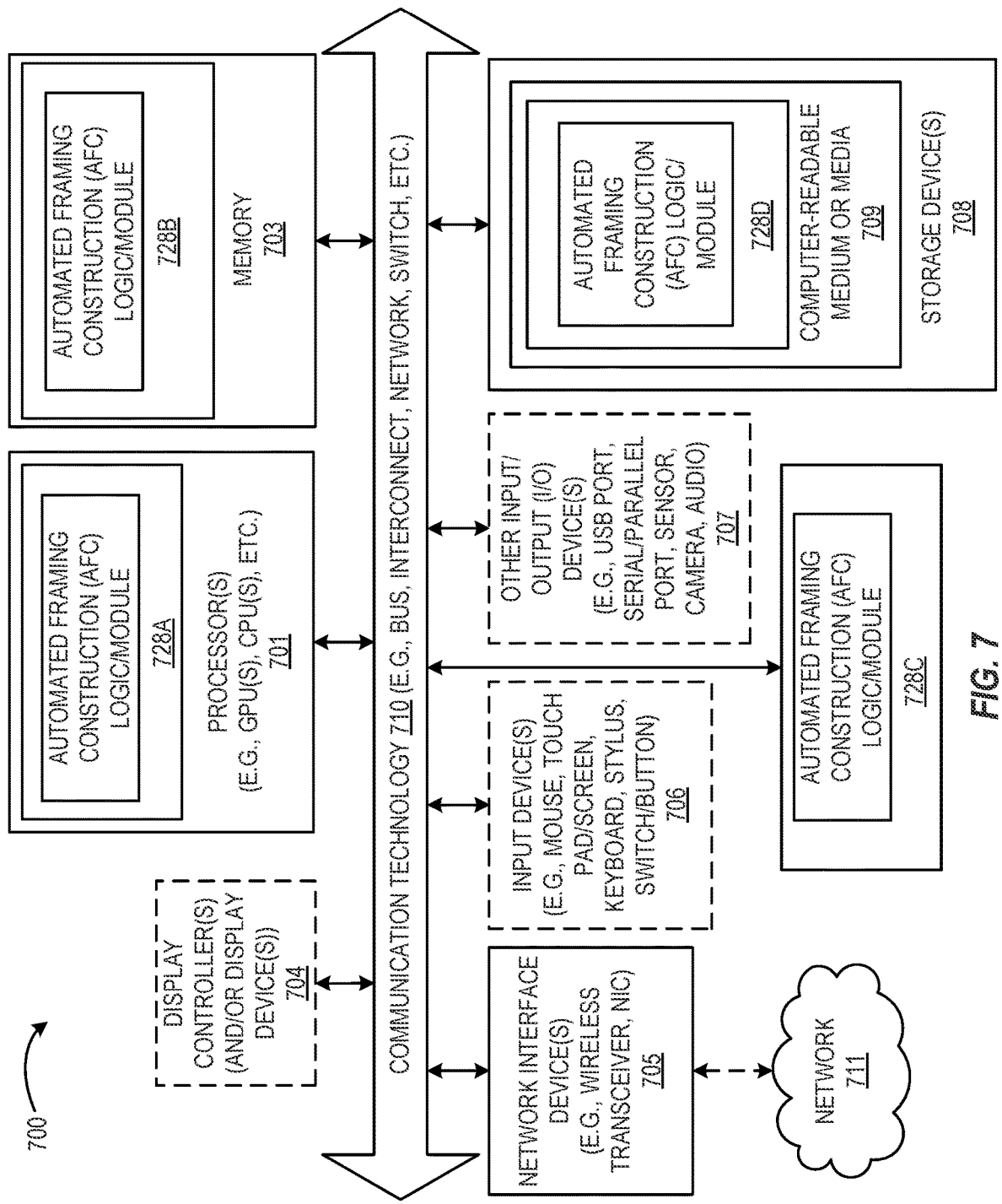
FIG. 7 is a schematic diagram of a computer system that can be used to implement one or more embodiments of automated framing construction described herein.

FIG. 7 is a block diagram illustrating an exemplary data processing system 700 that may be used with one or more of the described embodiments. For example, the system 700 may represent any data processing system (e.g., one or more of the systems described above performing any of the operations or methods described above in connection with FIGS. 1A-6, etc.). The system 700 can include many different components. These components can be implemented as integrated circuits (ICs), portions thereof, discrete electronic devices, or other modules adapted to a circuit board such as a motherboard or add-in card of a computer system, or as components otherwise incorporated within a chassis of a computer system. Note also that the system 700 is intended to show a high-level view of many, but not all, components of the computer system. Nevertheless, it is to be understood that additional components may be present in certain implementations and furthermore, different arrangements of the components shown may occur in other implementations. The system 700 may represent a desktop computer system, a laptop computer system, a tablet computer system, a server computer system, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute instructions to perform any of the methodologies discussed herein.

For one embodiment, the system 700 includes processor(s) 701, memory 703, devices 705-709, and device 711 via a communication technology 710 (e.g., a bus, an interconnect, a network, a switch, any other suitable communication technology, or any combination thereof, etc.). The system 700 also includes a network 712. Processor(s) 701 may represent a single processor or multiple processors with a single processor core or multiple processor cores included therein. Processor(s) 701 may represent one or more general-purpose processors such as a microprocessor, a central processing unit (CPU), graphics processing unit (GPU), or the like. More particularly, processor(s) 701 may be a complex instruction set computer (CISC), a reduced instruction set computer (RISC) or a very long instruction word (VLIW) computer architecture processor, or processors implementing a combination of instruction sets. Processor(s) 701 may also be one or more special-purpose processors such as an application specific integrated circuit (ASIC), an application-specific instruction set processor (ASIP), a cellular or baseband processor, a field programmable gate array (FPGA), a digital signal processor (DSP), a physics processing unit (PPU), an image processor, an audio processor, a network processor, a graphics processor, a graphics processing unit (GPU), a network processor, a communications processor, a cryptographic processor, a co-processor, an embedded processor, a floating-point unit (FPU), or any logic that can process instructions.

Processor(s) 701, which may be a low power multi-core processor socket such as an ultra-low voltage processor, may act as a main processing unit and central hub for communication with the various components of the system. Such processor(s) can be implemented as one or more system-on-chip (SoC) integrated circuits (ICs). An automated framing construction logic/module 728A may reside, completely or at least partially, within processor(s) 701. In one embodiment, the AFC logic/module 728A enables the processor(s) 701 to perform any or all of the operations or methods described above in connection with FIGS. 1A-6. Additionally, or alternatively, the processor(s) 701 may be configured to execute instructions for performing the operations and methodologies discussed herein.

System 700 may further include a graphics interface that communicates with optional graphics subsystem 704, which may include a display controller, a graphics processing unit (GPU), and/or a display device. Processor(s) 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor(s) 701 or any other device. For example, executable code and/or data from a variety of operating systems, device drivers, firmware (e.g., input output basic system or BIOS), and/or applications can be loaded in memory 703 and executed by processor(s) 701. An operating system can be any kind of operating system. An AFC logic/module 728D may also reside, completely or at least partially, within memory 703.

For one embodiment, the memory 703 includes an AFC logic/module 728B as executable instructions. For another embodiment, when the instructions represented by AFC logic/module 728B are executed by the processor(s) 701, the instructions cause the processor(s) 701 to perform any, all, or some of the operations or methods described above in connection with FIGS. 1A-6.

System 700 may further include input/output (I/O) devices such as devices 705-708, including network interface device(s) 705, optional input device(s) 706, and other optional input/output (I/O) device(s) 707. Network interface device(s) 705 may include a wired or wireless transceiver and/or a network interface card (NIC). The wireless transceiver may be a Wireless Fidelity (Wi-Fi) transceiver, an infrared transceiver, a Bluetooth transceiver, a Worldwide Interoperability for Microwave Access (WiMAX) transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with display device 704), a pointer device such as a stylus, and/or a keyboard (e.g., a physical keyboard or a virtual keyboard displayed as part of a touch sensitive screen). For example, input device 706 may include a touch screen controller coupled to a touch screen. The touch screen and touch screen controller can, for example, detect contact and movement or a break thereof using one or more touch sensitivity technologies, including but not limited to capacitive, resistive, infrared, and surface acoustic wave technologies, as well as other proximity sensor arrays or other elements for determining one or more points of contact with the touch screen.

I/O devices 707 may include an audio device. An audio device may include a speaker and/or a microphone to facilitate voice-enabled functions, such as voice recognition, voice replication, digital recording, and/or telephony functions. Other I/O devices 707 may include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Device(s) 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to communication technology 710 via a sensor hub (not shown), while other devices such as a keyboard or thermal sensor may be controlled by an embedded controller (not shown), dependent upon the specific configuration or design of system 700.

To provide for persistent storage for information such as data, applications, one or more operating systems and so forth, a mass storage device or devices (not shown) may also be coupled to processor(s) 701. For various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. In addition, a flash device may be coupled to processor(s) 701, e.g., via a serial optional peripheral interface (SPI). This flash device may provide for non-volatile storage of system software, including a basic input/output software (BIOS) and other firmware.

An AFC logic/module 728C may be part of a specialized stand-alone computing system/device 711 that is formed from hardware, software, or a combination thereof. For one embodiment, the AFC logic/module 728C performs any, all, or some of the operations or methods described above in connection with FIGS. 1A-6.

Storage device 708 may include computer-accessible storage medium 709 (also known as a machine-readable storage medium or a computer-readable medium) on which one or more sets of instructions or software are stored—e.g., an AFC logic/module 728D.

For one embodiment, the instruction(s) or software stored on storage medium 709 embody one or more methodologies or functions described above in connection with FIGS. 1A-6. For another embodiment, the storage device 708 includes an AFC logic/module 728D as executable instructions. When the instructions represented by an AFC logic/module 728D are executed by the processor(s) 701, the instructions cause the system 700 to perform any, all, or some of the operations or methods described above in connection with FIGS. 1A-6.

Computer-readable storage medium 709 can store some or all of the software functionalities of an AFC logic/module 728A-728D described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the system 700 and that cause the system 700 to perform any one or more of the disclosed methodologies. The term "computer-readable storage medium" shall accordingly be taken to include, but not be limited to, solid-state memories, and optical and magnetic media, or any other non-transitory machine-readable medium.

Note that while system 700 is illustrated with various components of a data processing system, it is not intended to represent any particular architecture or manner of interconnecting the components; as such, details are not germane to the embodiments described herein. It will also be appreciated that network computers, handheld computers, mobile phones, servers, and/or other data processing systems, which have fewer components or perhaps more components, may also be used with the embodiments described herein.

In the foregoing description, numerous specific details are set forth, such as specific configurations, dimensions and processes, etc., in order to provide a thorough understanding of the embodiments. In other instances, well-known processes and manufacturing techniques have not been described in particular detail in order to not unnecessarily obscure the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one embodiment. Thus, the appearances of the phrase "for one embodiment," "for an embodiment," "for another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments.

In the following description and claims, the terms "coupled" and "connected," along with their derivatives, may be used. It should be understood that these terms are not intended as synonyms for each other. "Coupled" is used to indicate that two or more elements or components, which may or may not be in direct physical or electrical contact with each other, co-operate or interact with each other. "Connected" is used to indicate the establishment of communication between two or more elements or components that are coupled with each other.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing system, that manipulates and transforms data represented as physical (electronic) quantities within the computer system's registers and memories into other data similarly represented as physical quantities within the computer system memories or registers or other such information storage, transmission or display devices.

Embodiments described herein can relate to an apparatus for performing a computer program (e.g., the operations described herein, etc.). Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

Although operations or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the various embodiments of the disclosed subject matter. In utilizing the various aspects of the embodiments described herein, it would become apparent to one skilled in the art that combinations, modifications, or variations of the above embodiments are possible for managing components of a processing system to increase the power and performance of at least one of those components. Thus, it will be evident that various modifications may be made thereto without departing from the broader spirit and scope of at least one of the disclosed concepts set forth in the following claims. The specification and drawings are, accordingly, to be regarded in an illustrative sense rather than a restrictive sense.

In the development of any actual implementation of one or more of the disclosed concepts (e.g., such as a software and/or hardware development project, etc.), numerous decisions must be made to achieve the developers' specific goals (e.g., compliance with system-related constraints and/or business-related constraints). These goals may vary from one implementation to another, and this variation could affect the actual implementation of one or more of the disclosed concepts set forth in the embodiments described herein. Such development efforts might be complex and time-consuming, but may still be a routine undertaking for a person having ordinary skill in the art in the design and/or implementation of one or more of the inventive concepts set forth in the embodiments described herein.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network 711, a communication technology 710. Examples of communication networks 710 and 711 include a local area network ("LAN") and a wide area network ("WAN"), e.g., the Internet, a fiber network, a storage network, or a combination thereof, wired or wireless. Components of a network 710 and/or 711 do not have to be physically co-located. For example, separate components in system 700 may be linked directly over a network 710 or 711 even though these components may not be physically located next to each other. For example, two or more of the display controller/device 704, the processor(s) 701, the memory 703, the network interface device(s) 705, the input devices 706, and other I/O device(s) 707 are in distinct physical locations from each other and are communicatively coupled via the communication technology 710 and/or network 711, each of which can include an interconnect, a network, or a switch that links these components.

The computing system 700 can include clients and servers. A client and server are generally remote from each other and typically interact through a communication network (e.g., communication technology 710, network 711, any combination thereof, etc.). The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. Furthermore, and as used in the description above and the claims below, the phrase "at least one of A, B, or C" includes A alone, B alone, C alone, a combination of A and B, a combination of B and C, a combination of A and C, and a combination of A, B, and C. That is, the phrase "at least one of A, B, or C" means A, B, C, or any combination thereof, and should not be interpreted as requiring at least one of each of the listed elements A, B and C, regardless of whether A, B and C are related as categories or otherwise. Furthermore, the use of the article "a" or "the" in introducing an element should not be interpreted as being exclusive of a plurality of elements. Also, the recitation of "A, B and/or C" is equal to "at least one of A, B or C."

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A robotic automated framing system, comprising:
a first robot arm and a second robot arm, wherein each of the first and second robot arms are configured to work together cooperatively to join two pieces building material;
a controller communicatively coupled to each of the first and second robot arms, wherein the controller is configured to operate the first and second robot arms to cooperatively perform a project based on a plan; and
swappable tools mounted on the first and second robot arms used for joining the two pieces building materials, wherein the swappable tools are selected based on the project to be performed.

2. The robotic automated framing system of claim 1, wherein the controller is configured to:
analyze an architectural plan, the architectural plan for use in the construction of a building structure;
determine the project based, at least in part, on the architectural plan;
schedule the first and second robot arms to perform the project; and
cause the first and second robot arms to perform at least some of the project.

3. The robotic automated framing system of claim 2, wherein the architectural plan includes a building code.

4. The robotic automated framing system of claim 1, wherein the controller is configured to optimize the schedule using artificial intelligence ("AI").

5. The robotic automated framing system of claim 1, wherein the swappable tools include a gripper, an alignment tool, a measuring tool, a fastening tool, a coupling tool, an encapsulation tool, a cutting tool, a finishing tool, a painting tool, or any combination thereof.

6. The robotic automated framing system of claim 1, wherein the controller is configured to operate the swappable tools.

7. The robotic automated framing system of claim 1, wherein the controller is configured to:
select a first piece of building material or a second piece of building material;
align the first piece of building material and the second piece of building material with each other; and
join the first and second pieces of building material to each other.

8. The robotic automated framing system of claim 1, wherein each of the first and second robot arms comprise respective smaller robot arms configured for performing fine movements.

9. The robotic automated framing system of claim 1, further comprising a sensor suite configured to communicate sensor data with the controller.

10. The robotic automated framing system of claim 9, wherein the controller is configured to determine one or more characteristics of a first piece of building material or a second piece of building material using information acquired from a sensor of the sensor suite.

11. The robotic automated framing system of claim 1, wherein the architectural plan comprises at least one of an architectural drawing, or a structural drawing.

12. The robotic automated framing system of claim 1, wherein the controller is configured to evaluate a project configuration to find a target project configuration.

13. The robotic automated framing system of claim 12, wherein the controller is configured to determine an optimized project configuration based on the evaluated project configuration.

14. The robotic automated framing system of claim 12, wherein the project configuration comprises one or more projects.

15. The robotic automated framing system of claim 12, wherein the target project configuration optimizes at least one of lumber usage, and robot arm operation.

16. The robotic automated framing system of claim 1, wherein the project comprises a wall panelization process.

17. The robotic automated framing system of claim 1, wherein the controller is configured to select a project having a particular framing configuration.

18. The robotic automated framing system of claim 1, wherein the controller is configured to operate the first and second robot arms to assemble a wall panel based on a physical wall definition of a wall panel provided by the user.

19. The robotic automated framing system of claim 1 wherein, subsequent to assembling the wall panel, the controller is configured to operate the first and second robot arms to execute a build procedure based on the physical definition.

20. The robotic automated framing system of claim 1 wherein, the controller is configured to communicate with each of the first and the second robot arms via at least one of a wired network, or a wireless network.

* * * * *